(12) United States Patent
Dunn

(10) Patent No.: US 12,363,379 B2
(45) Date of Patent: *Jul. 15, 2025

(54) PROOF OF PLAY FOR IMAGES DISPLAYED AT ELECTRONIC DISPLAYS

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,492

(22) Filed: Dec. 22, 2023

(65) Prior Publication Data

US 2024/0179373 A1 May 30, 2024

Related U.S. Application Data

(63) Continuation of application No. 17/567,442, filed on Jan. 3, 2022, now Pat. No. 11,895,362.

(Continued)

(51) Int. Cl.
*H04N 21/442* (2011.01)
*H04N 21/81* (2011.01)

(52) U.S. Cl.
CPC ..... *H04N 21/44204* (2013.01); *H04N 21/812* (2013.01)

(58) Field of Classification Search
CPC .............. H04N 21/2407; H04N 21/44204
See application file for complete search history.

(56) References Cited

U.S. PATENT DOCUMENTS 4,271,410 A 6/1981 Crawford
4,399,456 A 8/1983 Zalm
(Continued)

FOREIGN PATENT DOCUMENTS

AU 2017273560 B2 1/2020
CA 3024512 C 12/2020
(Continued)

OTHER PUBLICATIONS

AMS AG, TCS3404, TCS3414, Digital Color Sensors, Apr. 2011, 41 pages, Texas Advanced Optoelectronic Solutions Inc. is now ams AG.

(Continued)

*Primary Examiner* — John W Miller
*Assistant Examiner* — Akshay Doshi
(74) *Attorney, Agent, or Firm* — Standley Law Group LLP; Jeffrey S. Standley; Adam J. Smith

(57) ABSTRACT

A proof of play information system, and related assemblies and methods are provided. Electronic display assemblies include media players providing content for display at electronic displays thereof, some of which includes static advertising images. A unit controller is electronically interposed between the media player and the electronic display. Redundancy check codes are generated for the content items transmitted from the media player to the electronic display. If a consistent redundancy check code is consecutively generated for a respective one of the content items, cause a play count associated with the respective one of the content items is incremented.

20 Claims, 12 Drawing Sheets

Related U.S. Application Data

(60) Provisional application No. 63/282,737, filed on Nov. 24, 2021, provisional application No. 63/273,616, filed on Oct. 29, 2021.

(56) References Cited

U.S. PATENT DOCUMENTS

| | | |
|---|---|---|
| 4,456,910 A | 6/1984 | DiMassimo et al. |
| 4,571,616 A | 2/1986 | Haisma et al. |
| 4,593,978 A | 6/1986 | Mourey et al. |
| 4,753,519 A | 6/1988 | Miyatake |
| 5,029,982 A | 7/1991 | Nash |
| 5,049,987 A | 9/1991 | Hoppenstein |
| 5,081,523 A | 1/1992 | Frazier |
| 5,088,806 A | 2/1992 | McCartney et al. |
| 5,093,654 A | 3/1992 | Swift et al. |
| 5,115,229 A | 5/1992 | Shalit |
| 5,162,645 A | 11/1992 | Wagensonner et al. |
| 5,162,785 A | 11/1992 | Fagard |
| 5,351,201 A | 9/1994 | Harshbarger, Jr. et al. |
| 5,402,141 A | 3/1995 | Haim et al. |
| 5,565,894 A | 10/1996 | Bates et al. |
| 5,656,824 A | 8/1997 | den Boer et al. |
| 5,663,952 A | 9/1997 | Gentry, Jr. |
| 5,694,141 A | 12/1997 | Chee |
| 5,751,346 A | 5/1998 | Dozier et al. |
| 5,835,074 A | 11/1998 | Didier et al. |
| 5,872,593 A | 2/1999 | Kawashima |
| 5,886,731 A | 3/1999 | Ebisawa |
| 5,912,743 A | 6/1999 | Kinebuchi et al. |
| 6,027,222 A | 2/2000 | Oki et al. |
| 6,032,126 A | 2/2000 | Kaehler |
| 6,055,012 A | 4/2000 | Haskell et al. |
| 6,075,556 A | 6/2000 | Urano et al. |
| 6,091,777 A | 7/2000 | Guetz et al. |
| 6,094,457 A | 7/2000 | Linzer et al. |
| 6,100,906 A | 8/2000 | Asaro et al. |
| 6,153,985 A | 11/2000 | Grossman |
| 6,192,083 B1 | 2/2001 | Linzer et al. |
| 6,259,492 B1 | 7/2001 | Imoto et al. |
| 6,292,157 B1 | 9/2001 | Greene et al. |
| 6,292,228 B1 | 9/2001 | Cho |
| 6,297,859 B1 | 10/2001 | George |
| 6,326,934 B1 | 12/2001 | Kinzie |
| 6,359,390 B1 | 3/2002 | Nagai |
| 6,392,727 B1 | 5/2002 | Larson et al. |
| 6,417,900 B1 | 7/2002 | Shin et al. |
| 6,421,103 B2 | 7/2002 | Yamaguchi |
| 6,421,694 B1 | 7/2002 | Nawaz et al. |
| 6,428,198 B1 | 8/2002 | Saccomanno et al. |
| 6,536,041 B1 | 3/2003 | Knudson et al. |
| 6,546,294 B1 | 4/2003 | Kelsey et al. |
| 6,553,336 B1 | 4/2003 | Johnson et al. |
| 6,587,525 B2 | 7/2003 | Jeong et al. |
| 6,642,666 B1 | 11/2003 | St-Germain |
| 6,674,463 B1 | 1/2004 | Just et al. |
| 6,690,726 B1 | 2/2004 | Yavits et al. |
| 6,697,100 B2 | 2/2004 | Tatsuzawa |
| 6,698,020 B1 | 2/2004 | Zigmond et al. |
| 6,701,143 B1 | 3/2004 | Dukach et al. |
| 6,712,046 B2 | 3/2004 | Nakamichi |
| 6,812,851 B1 | 11/2004 | Dukach et al. |
| 6,820,050 B2 | 11/2004 | Simmon et al. |
| 6,825,899 B2 | 11/2004 | Kobayashi |
| 6,850,209 B2 | 2/2005 | Mankins et al. |
| 6,859,215 B1 | 2/2005 | Brown et al. |
| 6,996,460 B1 | 2/2006 | Krahnstoever et al. |
| 7,038,186 B2 | 5/2006 | De Brabander et al. |
| 7,057,590 B2 | 6/2006 | Lim et al. |
| 7,103,852 B2 | 9/2006 | Kairis, Jr. |
| 7,136,415 B2 | 11/2006 | Yun et al. |
| 7,174,029 B2 | 2/2007 | Agostinelli et al. |
| 7,304,638 B2 | 12/2007 | Murphy |
| 7,307,614 B2 | 12/2007 | Vinn |
| 7,319,862 B1 | 1/2008 | Lincoln et al. |
| 7,358,851 B2 | 4/2008 | Patenaude et al. |
| 7,385,593 B2 | 6/2008 | Krajewski et al. |
| 7,391,811 B2 | 6/2008 | Itoi et al. |
| 7,480,042 B1 | 1/2009 | Phillips et al. |
| 7,518,600 B2 | 4/2009 | Lee |
| 7,519,703 B1 | 4/2009 | Stuart et al. |
| 7,573,458 B2 | 8/2009 | Dunn |
| 7,581,094 B1 | 8/2009 | Apostolopoulos et al. |
| 7,614,065 B2 | 11/2009 | Weissmueller et al. |
| 7,636,927 B2 | 12/2009 | Zigmond et al. |
| 7,669,757 B1 | 3/2010 | Crews et al. |
| 7,714,834 B2 | 5/2010 | Dunn |
| 7,764,280 B2 | 7/2010 | Shiina |
| 7,810,114 B2 | 7/2010 | Flickinger et al. |
| 7,813,694 B2 | 10/2010 | Fishman et al. |
| 7,825,991 B2 | 11/2010 | Enomoto |
| 7,924,263 B2 | 4/2011 | Dunn |
| 7,937,724 B2 | 5/2011 | Clark et al. |
| 7,988,849 B2 | 8/2011 | Biewer et al. |
| 8,130,836 B2 | 3/2012 | Ha |
| 8,212,921 B2 | 7/2012 | Yun |
| 8,218,812 B2 | 7/2012 | Sugimoto et al. |
| 8,242,974 B2 | 8/2012 | Yamazaki et al. |
| 8,350,799 B2 | 1/2013 | Wasinger et al. |
| 8,351,014 B2 | 1/2013 | Dunn |
| 8,400,570 B2 | 3/2013 | Dunn et al. |
| 8,417,376 B1 | 4/2013 | Smolen |
| 8,441,574 B2 | 5/2013 | Dunn et al. |
| 8,544,033 B1 | 9/2013 | Acharya et al. |
| 8,605,121 B2 | 12/2013 | Chu et al. |
| 8,654,302 B2 | 2/2014 | Dunn et al. |
| 8,689,343 B2 | 4/2014 | De Laet |
| 8,704,752 B2 | 4/2014 | Wasinger et al. |
| 8,766,893 B2 | 7/2014 | Wang |
| 8,767,165 B2 | 7/2014 | Dunn |
| 8,823,630 B2 | 9/2014 | Roberts et al. |
| 8,854,595 B2 | 10/2014 | Dunn |
| 8,989,718 B2 | 3/2015 | Ramer et al. |
| 9,026,686 B2 | 5/2015 | Dunn et al. |
| 9,031,872 B1 | 5/2015 | Foster |
| 9,141,329 B1 | 9/2015 | Reicher et al. |
| 9,147,194 B1 * | 9/2015 | Le .................... G06Q 30/0203 |
| 9,582,157 B1 | 2/2017 | Chatterjee et al. |
| 10,068,237 B2 | 9/2018 | Simske et al. |
| 10,185,969 B1 | 1/2019 | Holloway et al. |
| 10,194,564 B2 | 1/2019 | Dunn et al. |
| 10,225,718 B2 | 3/2019 | Kim et al. |
| 10,269,156 B2 | 4/2019 | Dunn et al. |
| 10,304,417 B2 | 5/2019 | Park et al. |
| 10,313,037 B2 | 6/2019 | De Laet et al. |
| 10,319,271 B2 | 6/2019 | Dunn et al. |
| 10,319,408 B2 | 6/2019 | Dunn |
| 10,398,066 B2 | 8/2019 | Dunn et al. |
| 10,467,610 B2 | 11/2019 | Dunn et al. |
| 10,485,113 B2 | 11/2019 | Dunn et al. |
| 10,510,304 B2 | 12/2019 | Dunn et al. |
| 10,660,245 B2 | 5/2020 | Dunn et al. |
| 10,756,836 B2 | 8/2020 | De Laet et al. |
| 10,922,736 B2 | 2/2021 | Williams et al. |
| 2001/0019454 A1 | 9/2001 | Tadic-Galeb et al. |
| 2002/0009978 A1 | 1/2002 | Dukach et al. |
| 2002/0013144 A1 | 1/2002 | Waters et al. |
| 2002/0018522 A1 | 2/2002 | Wiedenmann |
| 2002/0026354 A1 | 2/2002 | Shoji et al. |
| 2002/0065046 A1 | 5/2002 | Mankins et al. |
| 2002/0084891 A1 | 7/2002 | Mankins et al. |
| 2002/0112026 A1 | 8/2002 | Fridman et al. |
| 2002/0118320 A1 | 8/2002 | Bayrle et al. |
| 2002/0120721 A1 | 8/2002 | Eilers et al. |
| 2002/0147648 A1 | 10/2002 | Fadden et al. |
| 2002/0154138 A1 | 10/2002 | Wada et al. |
| 2002/0163513 A1 | 11/2002 | Tsuji |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0030733 A1 | 2/2003 | Seaman et al. |
| 2003/0031128 A1 | 2/2003 | Kim et al. |
| 2003/0039312 A1 | 2/2003 | Horowitz et al. |

(56) References Cited

U.S. PATENT DOCUMENTS

| | | |
|---|---|---|
| 2003/0061316 A1 | 3/2003 | Blair et al. |
| 2003/0098881 A1 | 5/2003 | Nolte et al. |
| 2003/0115591 A1 | 6/2003 | Weissmueller, Jr. et al. |
| 2003/0117428 A1 | 6/2003 | Li et al. |
| 2003/0125892 A1 | 7/2003 | Edge |
| 2003/0160734 A1 | 8/2003 | Rogers |
| 2003/0161354 A1 | 8/2003 | Bader et al. |
| 2003/0177269 A1 | 9/2003 | Robinson et al. |
| 2003/0192060 A1 | 10/2003 | Levy |
| 2003/0196208 A1 | 10/2003 | Jacobson |
| 2003/0202605 A1 | 10/2003 | Hazra et al. |
| 2003/0227428 A1 | 12/2003 | Nose |
| 2004/0012722 A1 | 1/2004 | Alvarez |
| 2004/0036622 A1 | 2/2004 | Dukach et al. |
| 2004/0114041 A1 | 6/2004 | Doyle et al. |
| 2004/0136698 A1 | 7/2004 | Mock |
| 2004/0138840 A1 | 7/2004 | Wolfe |
| 2004/0194131 A1 | 9/2004 | Ellis et al. |
| 2004/0207738 A1 | 10/2004 | Wacker |
| 2004/0252187 A1 | 12/2004 | Alden |
| 2005/0005302 A1 | 1/2005 | Zigmond et al. |
| 2005/0012734 A1 | 1/2005 | Johnson et al. |
| 2005/0046951 A1 | 3/2005 | Sugihara et al. |
| 2005/0071252 A1 | 3/2005 | Henning et al. |
| 2005/0123001 A1 | 6/2005 | Craven et al. |
| 2005/0127796 A1 | 6/2005 | Olesen et al. |
| 2005/0134525 A1 | 6/2005 | Tanghe et al. |
| 2005/0134526 A1 | 6/2005 | Willem et al. |
| 2005/0184983 A1 | 8/2005 | Brabander et al. |
| 2005/0188402 A1 | 8/2005 | de Andrade et al. |
| 2005/0195206 A1 | 9/2005 | Wogsberg |
| 2005/0195330 A1 | 9/2005 | Zacks et al. |
| 2005/0216939 A1 | 9/2005 | Corbin |
| 2005/0253699 A1 | 11/2005 | Madonia |
| 2005/0289061 A1 | 12/2005 | Kulakowski et al. |
| 2005/0289588 A1 | 12/2005 | Kinnear |
| 2006/0087521 A1 | 4/2006 | Chu et al. |
| 2006/0150222 A1 | 7/2006 | McCafferty et al. |
| 2006/0160614 A1 | 7/2006 | Walker et al. |
| 2006/0184961 A1* | 8/2006 | Lee .................. H04N 21/23418 725/32 |
| 2006/0214904 A1 | 9/2006 | Kimura et al. |
| 2006/0215044 A1 | 9/2006 | Masuda et al. |
| 2006/0244702 A1 | 11/2006 | Yamazaki et al. |
| 2007/0047808 A1 | 3/2007 | Choe et al. |
| 2007/0089152 A1 | 4/2007 | Patten et al. |
| 2007/0094620 A1 | 4/2007 | Park |
| 2007/0120763 A1 | 5/2007 | De Paepe et al. |
| 2007/0127569 A1 | 6/2007 | Hatalker |
| 2007/0152949 A1 | 7/2007 | Sakai |
| 2007/0157260 A1 | 7/2007 | Walker |
| 2007/0164932 A1 | 7/2007 | Moon |
| 2007/0165955 A1 | 7/2007 | Hwang et al. |
| 2007/0168539 A1 | 7/2007 | Day |
| 2007/0200513 A1 | 8/2007 | Ha et al. |
| 2007/0211179 A1 | 9/2007 | Hector et al. |
| 2007/0220544 A1 | 9/2007 | Nash-Putnam |
| 2007/0241203 A1 | 10/2007 | Wagner et al. |
| 2007/0247594 A1 | 10/2007 | Tanaka |
| 2007/0274400 A1 | 11/2007 | Murai et al. |
| 2007/0286107 A1 | 12/2007 | Singh et al. |
| 2007/0297172 A1 | 12/2007 | Furukawa et al. |
| 2008/0008471 A1 | 1/2008 | Dress |
| 2008/0017422 A1 | 1/2008 | Carro |
| 2008/0018584 A1 | 1/2008 | Park et al. |
| 2008/0028059 A1 | 1/2008 | Shin et al. |
| 2008/0037783 A1 | 2/2008 | Kim et al. |
| 2008/0055247 A1 | 3/2008 | Boillot |
| 2008/0074372 A1 | 3/2008 | Baba et al. |
| 2008/0093443 A1 | 4/2008 | Barcelou |
| 2008/0104631 A1 | 5/2008 | Krock et al. |
| 2008/0106527 A1 | 5/2008 | Cornish et al. |
| 2008/0112601 A1 | 5/2008 | Warp |
| 2008/0119237 A1 | 5/2008 | Kim |
| 2008/0120181 A1 | 5/2008 | Chang et al. |
| 2008/0143637 A1 | 6/2008 | Sunahara et al. |
| 2008/0158468 A1 | 7/2008 | Kim et al. |
| 2008/0163291 A1 | 7/2008 | Fishman et al. |
| 2008/0170028 A1 | 7/2008 | Yoshida |
| 2008/0174522 A1 | 7/2008 | Cho et al. |
| 2008/0201208 A1 | 8/2008 | Tie et al. |
| 2008/0231604 A1 | 9/2008 | Peterson |
| 2008/0232478 A1 | 9/2008 | Teng et al. |
| 2008/0246871 A1 | 10/2008 | Kupper et al. |
| 2008/0250445 A1 | 10/2008 | Zigmond et al. |
| 2008/0259198 A1 | 10/2008 | Chen et al. |
| 2008/0262914 A1 | 10/2008 | Suveyke et al. |
| 2008/0266331 A1 | 10/2008 | Chen et al. |
| 2008/0272999 A1 | 11/2008 | Kurokawa et al. |
| 2008/0278432 A1 | 11/2008 | Ohshima |
| 2008/0278455 A1 | 11/2008 | Atkins et al. |
| 2008/0291686 A1 | 11/2008 | Cull et al. |
| 2008/0303918 A1 | 12/2008 | Keithley |
| 2008/0313046 A1 | 12/2008 | Denenburg et al. |
| 2009/0003244 A1 | 1/2009 | Matsuo |
| 2009/0036190 A1 | 2/2009 | Brosnan et al. |
| 2009/0058845 A1 | 3/2009 | Fukuda et al. |
| 2009/0102914 A1 | 4/2009 | Collar et al. |
| 2009/0102973 A1 | 4/2009 | Harris |
| 2009/0109165 A1 | 4/2009 | Park et al. |
| 2009/0128867 A1 | 5/2009 | Edge |
| 2009/0129556 A1 | 5/2009 | Ahn |
| 2009/0164615 A1 | 6/2009 | Akkanen |
| 2009/0182917 A1 | 7/2009 | Kim |
| 2009/0219295 A1 | 9/2009 | Reijnaerts |
| 2009/0251602 A1 | 10/2009 | Williams et al. |
| 2009/0254439 A1 | 10/2009 | Dunn |
| 2009/0256965 A1 | 10/2009 | Moote et al. |
| 2009/0257620 A1 | 10/2009 | Hicks |
| 2009/0260028 A1 | 10/2009 | Dunn et al. |
| 2009/0267866 A1 | 10/2009 | Reddy et al. |
| 2009/0273568 A1 | 11/2009 | Milner |
| 2009/0284457 A1 | 11/2009 | Botzas et al. |
| 2009/0289968 A1 | 11/2009 | Yoshida |
| 2009/0313125 A1 | 12/2009 | Roh et al. |
| 2009/0315867 A1 | 12/2009 | Sakamoto et al. |
| 2009/0319231 A1 | 12/2009 | Beland et al. |
| 2009/0322991 A1 | 12/2009 | Furusawa |
| 2010/0039366 A1 | 2/2010 | Hardy |
| 2010/0039440 A1 | 2/2010 | Tanaka et al. |
| 2010/0039696 A1 | 2/2010 | de Groot et al. |
| 2010/0042506 A1 | 2/2010 | Ravenel et al. |
| 2010/0054552 A1 | 3/2010 | Abebe |
| 2010/0060550 A1 | 3/2010 | McGinn et al. |
| 2010/0066762 A1 | 3/2010 | Yeh et al. |
| 2010/0083305 A1 | 4/2010 | Acharya et al. |
| 2010/0104003 A1 | 4/2010 | Dunn et al. |
| 2010/0109974 A1 | 5/2010 | Dunn et al. |
| 2010/0121693 A1 | 5/2010 | Pacana |
| 2010/0164986 A1 | 7/2010 | Wei et al. |
| 2010/0171889 A1 | 7/2010 | Pantel et al. |
| 2010/0177157 A1 | 7/2010 | Berlage |
| 2010/0177158 A1 | 7/2010 | Walter |
| 2010/0188342 A1 | 7/2010 | Dunn |
| 2010/0194861 A1 | 8/2010 | Hoppenstein |
| 2010/0195865 A1 | 8/2010 | Luff |
| 2010/0198983 A1 | 8/2010 | Monroe et al. |
| 2010/0217613 A1 | 8/2010 | Kelly |
| 2010/0223114 A1 | 9/2010 | Yao et al. |
| 2010/0231563 A1 | 9/2010 | Dunn et al. |
| 2010/0238299 A1 | 9/2010 | Dunn et al. |
| 2010/0242081 A1 | 9/2010 | Dunn et al. |
| 2010/0253613 A1 | 10/2010 | Dunn et al. |
| 2010/0253778 A1 | 10/2010 | Lee et al. |
| 2011/0012856 A1 | 1/2011 | Maxwell et al. |
| 2011/0047567 A1 | 2/2011 | Zigmond et al. |
| 2011/0069018 A1 | 3/2011 | Atkins et al. |
| 2011/0074803 A1 | 3/2011 | Kerofsky |
| 2011/0078536 A1 | 3/2011 | Han et al. |
| 2011/0102630 A1 | 5/2011 | Rukes |
| 2011/0181693 A1 | 7/2011 | Lee et al. |
| 2011/0194730 A1 | 8/2011 | Rhoads et al. |
| 2011/0225859 A1 | 9/2011 | Safavi |
| 2011/0258011 A1 | 10/2011 | Burns et al. |

(56) References Cited

U.S. PATENT DOCUMENTS

| | | |
|---|---|---|
| 2011/0273482 A1 | 11/2011 | Massart et al. |
| 2012/0075362 A1 | 3/2012 | Ichioka et al. |
| 2012/0147046 A1 | 6/2012 | Chao |
| 2012/0182278 A1 | 7/2012 | Ballestad |
| 2012/0188262 A1 | 7/2012 | Rabii |
| 2012/0203872 A1 | 8/2012 | Luby et al. |
| 2012/0243727 A1 | 9/2012 | Hwang et al. |
| 2012/0268350 A1 | 10/2012 | Yoshimura |
| 2012/0302343 A1 | 11/2012 | Hurst et al. |
| 2012/0306926 A1* | 12/2012 | Millet .................. G06T 3/4007 345/660 |
| 2013/0021524 A1 | 1/2013 | Tang |
| 2013/0103504 A1 | 4/2013 | Srinivasan et al. |
| 2013/0110565 A1 | 5/2013 | Means, Jr. et al. |
| 2013/0132170 A1 | 5/2013 | Yelisetti et al. |
| 2013/0155090 A1* | 6/2013 | Pourbigharaz ........ G06F 1/3265 345/589 |
| 2013/0162908 A1 | 6/2013 | Son et al. |
| 2013/0173358 A1 | 7/2013 | Pinkus |
| 2013/0232029 A1 | 9/2013 | Rovik et al. |
| 2013/0307975 A1 | 11/2013 | Ford et al. |
| 2013/0347019 A1 | 12/2013 | Herlein et al. |
| 2014/0043302 A1 | 2/2014 | Barnes |
| 2014/0082646 A1 | 3/2014 | Sandland |
| 2014/0101535 A1 | 4/2014 | Kim et al. |
| 2014/0114778 A1 | 4/2014 | Miller et al. |
| 2014/0132796 A1 | 5/2014 | Prentice et al. |
| 2014/0136935 A1 | 5/2014 | Santillie et al. |
| 2014/0139116 A1 | 5/2014 | Reed |
| 2014/0152786 A1 | 6/2014 | Nicholson |
| 2014/0160365 A1 | 6/2014 | Kwong et al. |
| 2014/0184547 A1 | 7/2014 | Tokunaga |
| 2014/0193084 A1 | 7/2014 | Mahinkanda et al. |
| 2014/0214525 A1 | 7/2014 | Tsai et al. |
| 2014/0222578 A1 | 8/2014 | Poornachandran et al. |
| 2014/0236728 A1 | 8/2014 | Wright |
| 2014/0240201 A1 | 8/2014 | Takahashi et al. |
| 2014/0245148 A1 | 8/2014 | Silva et al. |
| 2014/0246982 A1 | 9/2014 | Araki et al. |
| 2014/0333541 A1 | 11/2014 | Lee et al. |
| 2014/0361969 A1 | 12/2014 | Wasinger et al. |
| 2014/0375704 A1 | 12/2014 | Bi et al. |
| 2015/0070340 A1 | 3/2015 | Trachtenberg et al. |
| 2015/0106831 A1 | 4/2015 | Todd |
| 2015/0128076 A1 | 5/2015 | Fang et al. |
| 2015/0172848 A1 | 6/2015 | Gao et al. |
| 2015/0172878 A1 | 6/2015 | Luna |
| 2015/0195626 A1 | 7/2015 | Lee et al. |
| 2015/0227978 A1 | 8/2015 | Woycik et al. |
| 2015/0253937 A1 | 9/2015 | Kim et al. |
| 2015/0281774 A1 | 10/2015 | Atkin |
| 2015/0304593 A1 | 10/2015 | Sakai |
| 2015/0312488 A1 | 10/2015 | Kostrzewa et al. |
| 2015/0382072 A1 | 12/2015 | Lee et al. |
| 2016/0012487 A1 | 1/2016 | Bastaldo-Tsampalis et al. |
| 2016/0014103 A1 | 1/2016 | Masters et al. |
| 2016/0034240 A1 | 2/2016 | Kreiner et al. |
| 2016/0055823 A1 | 2/2016 | Feng et al. |
| 2016/0063954 A1 | 3/2016 | Ryu |
| 2016/0125777 A1 | 5/2016 | Knepper et al. |
| 2016/0134841 A1 | 5/2016 | Round et al. |
| 2016/0284059 A1 | 9/2016 | Gonzalez Solis |
| 2016/0293206 A1 | 10/2016 | Dunn |
| 2016/0300549 A1 | 10/2016 | Zhang |
| 2016/0301972 A1 | 10/2016 | Liu et al. |
| 2016/0335705 A1 | 11/2016 | Williams et al. |
| 2016/0358357 A1 | 12/2016 | Dunn et al. |
| 2016/0371269 A1* | 12/2016 | Pereira ................ G06F 16/2379 |
| 2017/0038846 A1 | 2/2017 | Minnen et al. |
| 2017/0083223 A1 | 3/2017 | Dintrone et al. |
| 2017/0090847 A1 | 3/2017 | Kambhatla |
| 2017/0111486 A1 | 4/2017 | Bowers et al. |
| 2017/0201797 A1 | 7/2017 | Kwon |
| 2017/0257978 A1* | 9/2017 | Diaz .................. H05K 7/20972 |
| 2017/0278440 A1 | 9/2017 | Dunn et al. |
| 2017/0346584 A1 | 11/2017 | De Laet et al. |
| 2018/0047345 A1 | 2/2018 | Dunn et al. |
| 2019/0034981 A1 | 1/2019 | Basra et al. |
| 2019/0113959 A1 | 4/2019 | Lee |
| 2019/0139015 A1 | 5/2019 | Dunn et al. |
| 2019/0245636 A1* | 8/2019 | De Laet ............ H04N 21/2407 |
| 2019/0295452 A1 | 9/2019 | Dunn et al. |
| 2019/0295594 A1 | 9/2019 | Dunn |
| 2020/0145721 A1* | 5/2020 | Tapse ............... H04N 21/23418 |
| 2020/0233637 A1* | 7/2020 | Vartakavi ............. G06F 16/639 |
| 2020/0404007 A1* | 12/2020 | Singh ............... G06F 16/24537 |
| 2023/0136695 A1 | 5/2023 | Dunn |

FOREIGN PATENT DOCUMENTS

| | | |
|---|---|---|
| CN | 1613264 A | 5/2005 |
| CN | 101777315 A | 7/2010 |
| CN | 102246196 A | 11/2011 |
| EP | 0313331 A2 | 4/1989 |
| EP | 1640337 A2 | 3/2006 |
| EP | 2332120 A2 | 6/2011 |
| EP | 2401736 A2 | 1/2012 |
| EP | 2401869 A2 | 1/2012 |
| EP | 2744213 A1 | 6/2014 |
| EP | 3433673 A0 | 1/2019 |
| EP | 3465613 A1 | 4/2019 |
| ID | 0514488 A | 9/2011 |
| JP | 2002064842 A | 2/2002 |
| JP | 2002209230 A | 7/2002 |
| JP | 2002366121 A | 12/2002 |
| JP | 2003-162707 A | 6/2003 |
| JP | 2005236469 A | 9/2005 |
| JP | 2006184859 A | 7/2006 |
| JP | 2008034841 A | 2/2008 |
| JP | 2008165055 A | 7/2008 |
| JP | 2008-283410 A | 11/2008 |
| JP | 2009009422 A | 1/2009 |
| JP | 2011-81197 A | 4/2011 |
| JP | 2013-195861 A | 9/2013 |
| JP | WO2016021127 A1 | 2/2016 |
| JP | 2019-514043 A | 5/2019 |
| KR | 20000021499 A | 4/2000 |
| KR | 20020072633 A | 9/2002 |
| KR | 10-2014-0051065 A | 4/2014 |
| KR | 10-2014-0061295 A | 5/2014 |
| KR | 10-2015-0053870 A | 5/2015 |
| KR | 10-2204132 B1 | 1/2021 |
| TW | 200403940 A | 3/2004 |
| WO | WO9608892 A1 | 3/1996 |
| WO | WO2006089556 A1 | 8/2006 |
| WO | WO2006111689 A1 | 10/2006 |
| WO | WO2009004574 A1 | 1/2009 |
| WO | WO2010037104 A2 | 4/2010 |
| WO | WO2010085783 A1 | 7/2010 |
| WO | WO2010085784 A2 | 7/2010 |
| WO | WO2010094039 A2 | 8/2010 |
| WO | WO2010099178 A2 | 9/2010 |
| WO | WO2010099194 A2 | 9/2010 |
| WO | WO2011026186 A1 | 3/2011 |
| WO | WO2011035370 A1 | 3/2011 |
| WO | WO2011044640 A1 | 4/2011 |
| WO | WO2011060487 A1 | 5/2011 |
| WO | WO2011143720 A1 | 11/2011 |
| WO | WO2016000546 A1 | 1/2016 |
| WO | WO2017165543 A1 | 9/2017 |
| WO | WO2017210317 A1 | 12/2017 |
| WO | WO2018031717 A2 | 2/2018 |
| WO | WO2023/076320 A1 | 5/2023 |

OTHER PUBLICATIONS

Analog Devices, ADV212: JPEG 2000 Video Codec, http://www.analog.com/en/audiovideo-products/video-compression/ADV212/products/pr . . . , accessed Oct. 15, 2008, 2 pages.

Analog Devices, Inc., JPEG 2000 Video Codec ADV212, 2006, 44 pages.

Photo Research, Inc., PR-650 SpectraScan Colorimeter, 1999, 2 pages.

(56) References Cited

OTHER PUBLICATIONS

Teravision Corp, LCD-TV Panel Control Board Specification, Nov. 2007, 24 pages.
Texas Advanced Optoelectronic Solutions Inc., TCS230 Programmable Color Light-To-Frequency Converter, Dec. 2007, 12 pages.
Texas Advanced Optoelectronic Solutions Inc., TCS3404CS, TCS3414CS Digital Color Light Sensors, Feb. 2009, 38 pages.
Wikipedia, Color rendering index, https://en.wikipedia.org/wiki/Color_rendering_index, accessed Aug. 25, 2016, 13 pages.
Wikipedia, Gamut, https://en.wikipedia.org/wiki/Gamut, accessed Aug. 25, 2016, 8 pages.
Wikipedia, Gradient-index optics, https://en.wikipedia.org/wiki/Gradient-index_optics, accessed Aug. 25, 2016, 5 pages.
Wikipedia, Alpha compositing, https://web.archive.org/web/20080801130026/https://en.wikipedia.org/wiki/Alpha_compositing, from Wikipedia on Aug. 1, 2008, retrieved on Jun. 6, 2018, 4 pages.
Outdoorlink, Inc., SmartLink One, One Relay, http://smartlinkcontrol.com/billboard/one-relay/, retrieved Apr. 17, 2019, 2007-16, 6 pages.
Outdoorlink, Inc., SmartLink Website User Manual, http://smartlink.outdoorlinkinc.com/docs/SmartLinkWebsiteUserManual.pdf, 2017, 33 pages.
Outdoorlink, Inc., SmartLink One Out of Home Media Controller, 2016, 1 page.
Rouaissia, C., Adding Proximity Detection to a Standard Analog-Resistive Touchscreen, SID 2012 Digest, 2012, 1564-1566, P-132.

\* cited by examiner

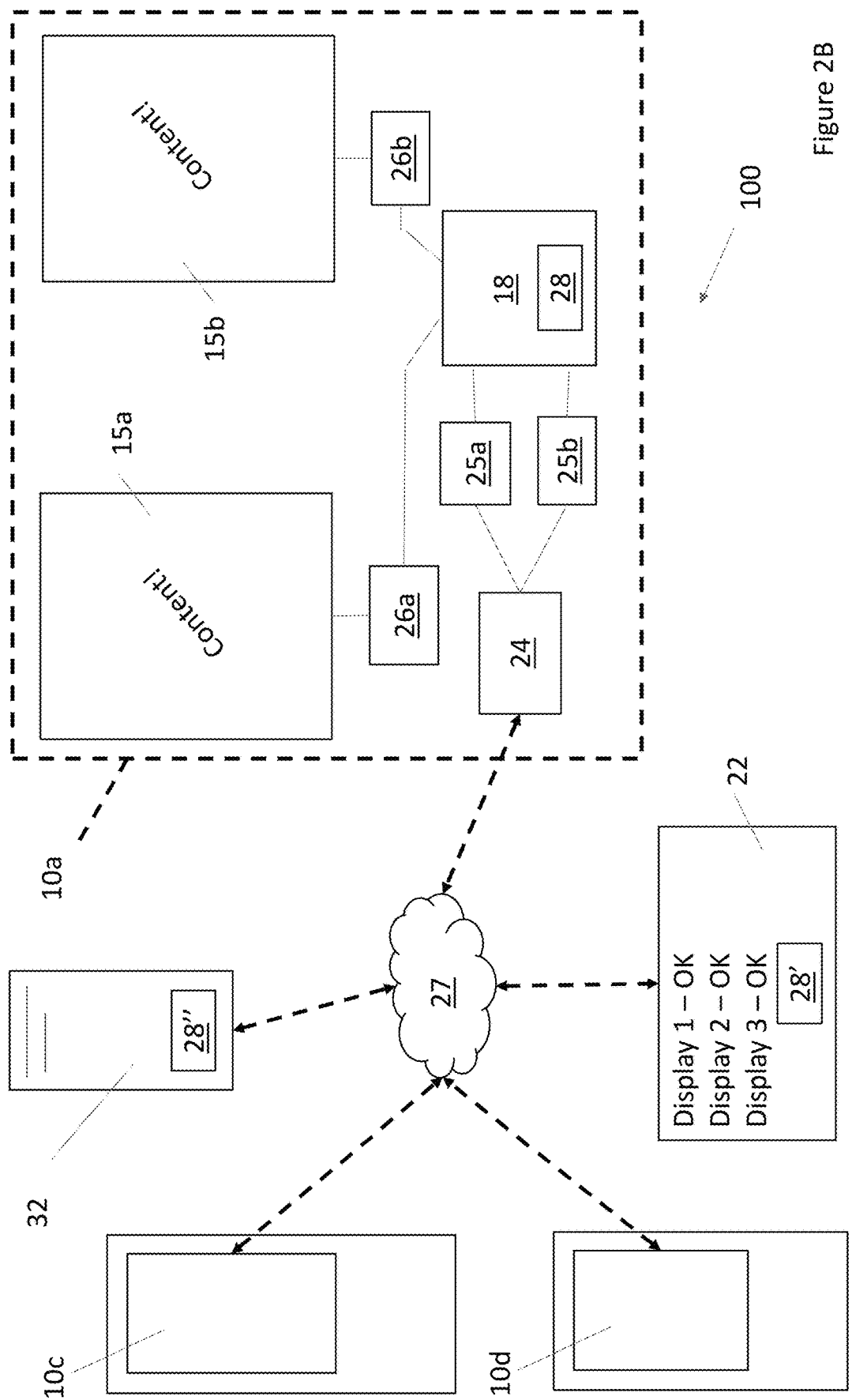

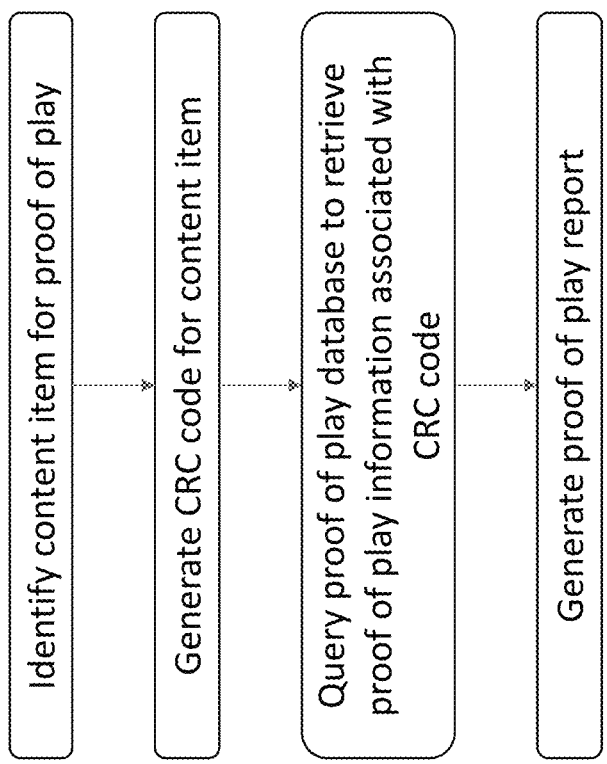

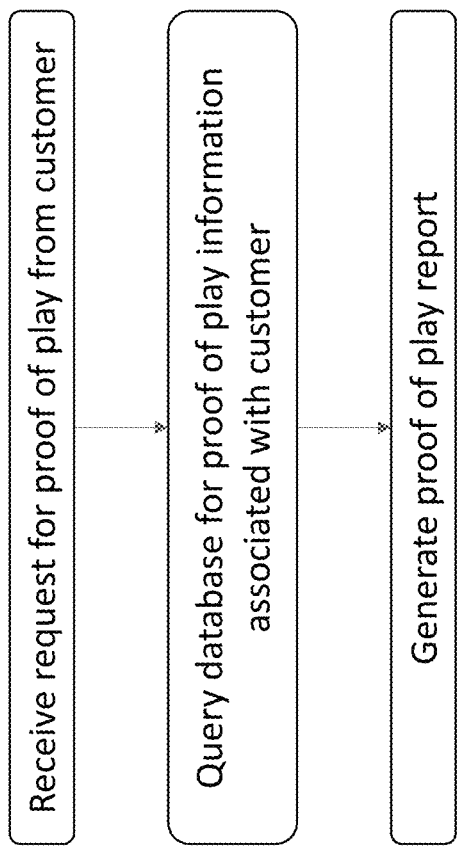

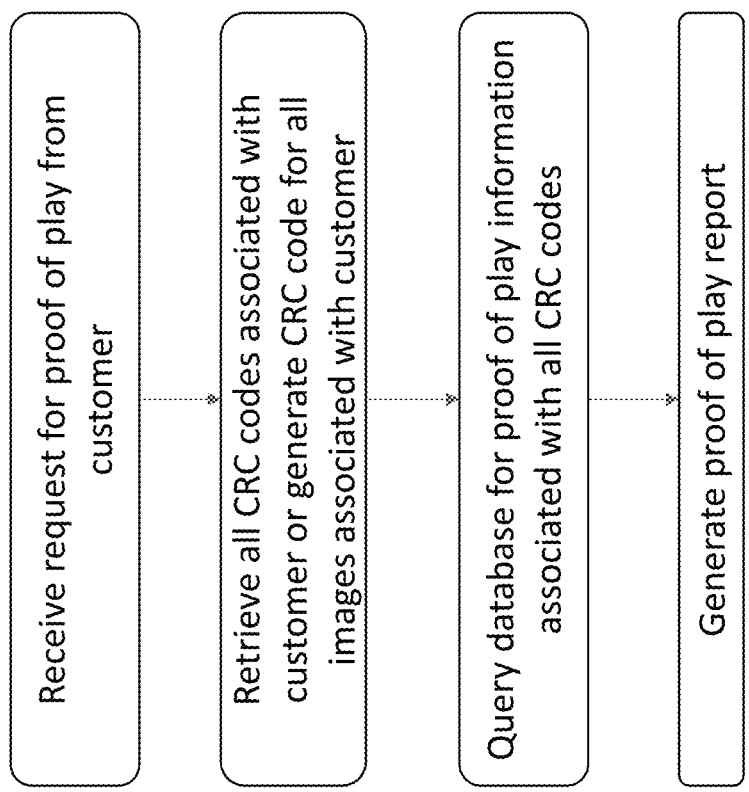

PROOF OF PLAY FOR IMAGES DISPLAYED AT ELECTRONIC DISPLAYS

CROSS-REFERENCE TO RELATED APPLICATIONS

This application is a continuation of U.S. patent application Ser. No. 17/567,442 filed Jan. 3, 2022, which claims the benefit of U.S. Provisional Patent Application Ser. No. 63/273,616 filed Oct. 29, 2021 and U.S. Provisional Patent Application Ser. No. 63/282,737 filed Nov. 24, 2021, the disclosures of each of which are hereby incorporated by reference as if fully restated herein.

TECHNICAL FIELD

Exemplary embodiments relate generally to systems and methods for providing proof of play for images displayed at electronic displays.

BACKGROUND AND SUMMARY OF THE INVENTION

The digital out of home ("DOOH") advertising market has grown in recent years to better reach an increasingly mobile population. Such DOOH advertising is often provided by way of ruggedized electronic display assemblies installed at various, relatively high traffic locations, such as city sidewalks, shopping malls, and transit stations to name a few examples. Static or dynamic content items, such as but not limited to advertisements, announcements, or other messages provided in one or more electronic images, may be displayed at these electronic display assemblies. Proof of play is often desired for such images. For example, electronic display assembly owners or operators want to know that their units are functional. As another example, customers paying for advertising opportunities want verification that their advertising dollars are being spent as agreed. Sometimes, proof of play is accomplished by provision of documents representing the playlist electronically provided to the media players of the electronic display assemblies. Essentially, these files represent input provided to the media players (i.e., play media file 1, then media file 2, then media file 3, etc.). However, for a number of reasons, images represented in these playlists may not actually be displayed at the electronic displays of the electronic display assemblies. For example, a named media file may be missing, corrupted, mislabeled, or otherwise unable to be called up by the media player. As another example, certain hardware of the assembly may be undergoing a software update and may override the display with a specified image for a period of time. As yet another example, the media player may be malfunctioning or inoperative. There are a number of other reasons why the images provided in the playlists may not actually be displayed. Furthermore, once an error occurs, the electronic displays may sometimes be frozen or otherwise unable to function properly for an extended period of time. Regardless, the playlists provided as input to the media players may not accurately represent the content items actually displayed. Therefore, what is needed are systems and methods which provide more accurate proof of play for electronic display assemblies.

Systems and methods which provide more accurate proof of play for electronic display assemblies are provided. The disclosed systems and methods may include the ability to provide duration of play information and/or play count information for content items displayed at electronic displays, such as but not limited to, dynamic content and static content items.

Unit controllers may be electronically interposed between media players and electronic displays. In exemplary embodiments, the unit controllers may be electronically interposed between the media players and field programmable gate arrays (FPGAs) for electronic display assemblies. In this way, data leaving the media players may be monitored for proof of play, rather than just playlists being fed to the media players. This may provide for more accurate proof of play reporting.

The unit controllers may comprise proof of play modules, though such proof of play modules may, alternatively or additionally, be provided elsewhere. The proof of play modules may be configured to generate cyclic redundancy check ("CRC") codes for some or all images leaving the media player. The generated CRC codes may be stored at a database in association with proof of play information, which may include start time of play, end time of play, duration of play, display unit information, number of plays, combinations thereof, or the like.

A CRC code may be generated for each image frame leaving the media player and stored at the database, in exemplary embodiments. However, in other exemplary embodiments, a CRC code may be generated for every $N^{th}$ number image frame, where "N" is any number (i.e., 1, 2, 3, etc.). Where static content items are displayed, the generated CRC code may be the same, or substantially the same, so long as the same image continues playing. In this manner, start times, end times, duration of play information, and/or a play count may be determined for each static content item displayed by monitoring the CRC codes for changes. For example, without limitation, where the CRC code changes, the proof of play module may determine that a new static content item is being started and record a start time accordingly. When the CRC code changes again, the proof of play module may determine that another new static content item has started and an end time may be recorded. From the start and end times, a duration of play may be determined.

Furthermore, the same CRC code may be generated where the same content item is displayed in different instances. For example, without limitation, even when the same image is played at several different times during the same or different days (whether as part of static content or dynamic content), the CRC code may remain the same, or substantially the same. Each time the CRC code is generated for a given instance, a play counter may be incremented accordingly. The proof of play modules may be configured to count each time a given CRC code is generated in an uninterrupted instance, such as where a static content item comprising a single image is displayed for a period of time, to be a single instance of play and increment the play counter accordingly (e.g., by one). In this manner, various proof of play information, including but not limited to, number and/or durations of play may be tracked across one or multiple displays for various time periods.

Where dynamic content is used, such as short movie clips, a CRC code may be generated for a first image, last image, $N^{th}$ image, combinations thereof, or the like. The CRC code may, alternatively or additionally, be generated as a numerical amalgamation of CRC codes for some or all images in a dynamic content item, such as but not limited to, by addition, subtraction, multiplication, division, averaging, combinations thereof, or the like. In this manner, a CRC code may be developed for dynamic content, such as on a consistent, repeatable basis.

If one of the CRC codes generated is not already stored at the database, electronic image data associated with such CRC code(s) may be stored with the proof of play information, such as a thumbnail version of the content item. If the CRC codes generated are already stored, the electronic image data may not be uploaded for storage. In this manner, use of network and/or electronic storage resources may be minimized.

Content items for which a proof of play report is desired may be uploaded, such as to one of the proof of play modules, the database, or the like. A CRC code may be generated for each uploaded content item by the same or different techniques as used to generate CRC codes for content items displayed at the electronic display assemblies. The database may be queried for proof of play information associated with each such CRC code to generate a proof of play report for each of the content items. Alternatively, or additionally, CRC code information, customer information, combinations thereof, or the like may be provided to generate the proof of play report, which may be image, customer, time range, and/or unit specific by way of non-limiting example. By storing CRC code information, such as rather than screen captures of every image displayed, electronic storage and/or network usage may be streamlined. The proof of play information may be stored in association with the CRC code information, customer information, combinations thereof, or the like to facilitate generation of such reports.

The proof of play reports may include duration of play information for some or all of the content items. This may be particularly important for static content items where customers often pay for a specified duration of play (e.g., 5 seconds). Duration of play information may also be important for dynamic content to demonstrate play of the entire clip, or of the clip multiple times, for example. Where dynamic content is utilized, the CRC code may be generated for a particular frame of a video, such as, but not limited to, the first frame, last frame, X number frame, combinations thereof, or the like. Multiple such CRC codes may, alternatively or additionally, by utilized and stored separately or numerically amalgamated into a single code. In this way, play count and other proof of play information may be stored for such dynamic content items. The proof of play report may optionally include a full size or thumbnail version of the image displayed. The proof of play report may, alternatively or additionally, indicate a number of times one of more content images has been played.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2B is another simplified system diagram for providing proof of play for multiple ones of the electronic display assembly of FIG. 1;

FIG. 4B is a flow chart with other exemplary logic for operating the systems of FIGS. 2A-2B;

FIG. 6A is a flow chart with exemplary logic for creating a customer specific summary report with the systems of FIGS. 2A-2B;

FIG. 6B is a flow chart with exemplary logic for creating a content item specific summary report with the systems of FIGS. 2A-2B;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
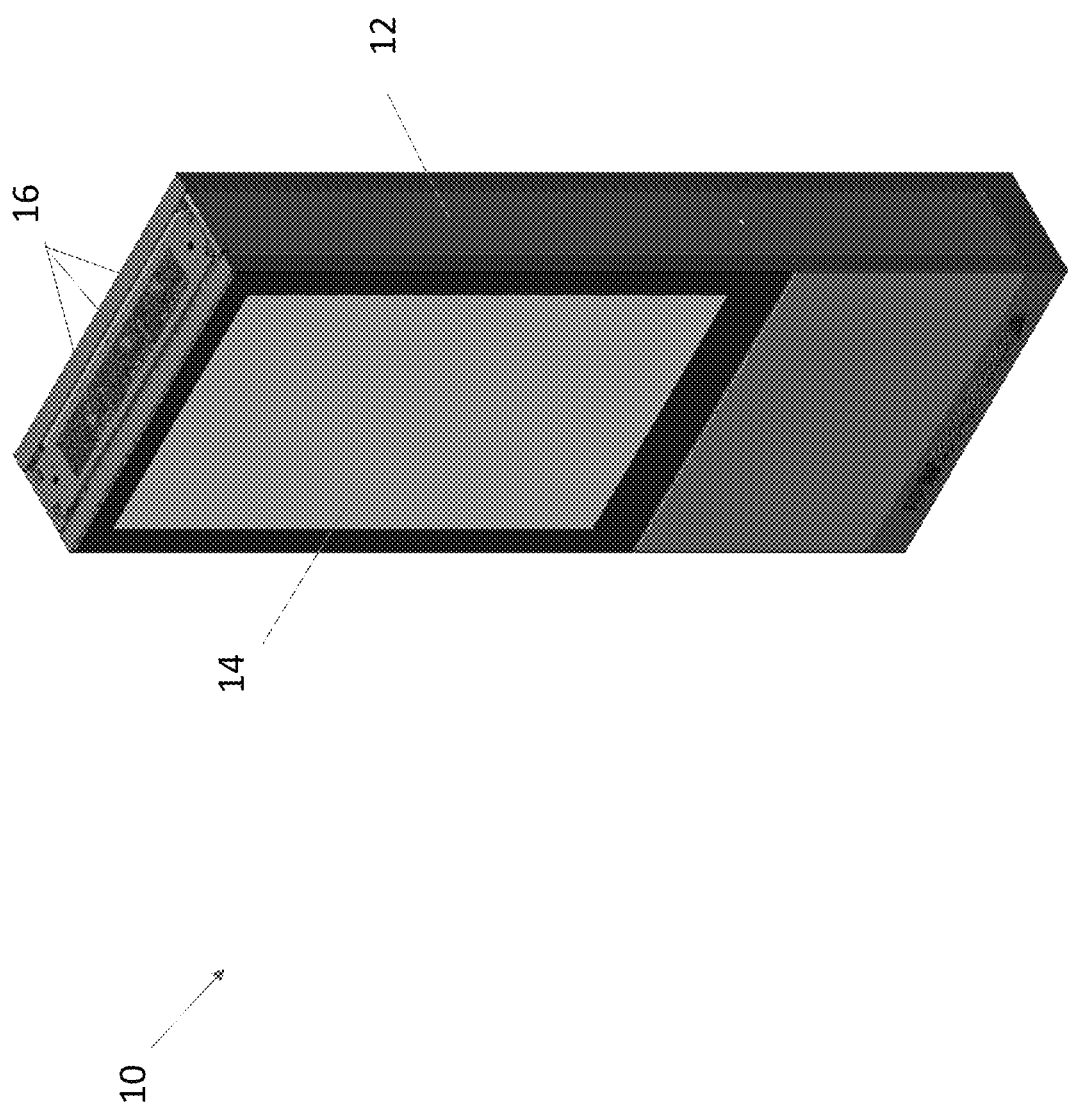
FIG. 1 is a perspective view of an exemplary electronic display assembly.

FIG. 1 is a perspective view of an exemplary electronic display assembly (hereinafter also a "unit") 10. The unit 10 may include a structural framework 12. The structural framework 12 may be configured for mounting to a ground surface, such as a sidewalk or street, mounting to a wall or other surface, incorporation into street furniture (e.g., phone booths, bus shelters, benches, railings, combinations thereof, or the like), combinations thereof, or the like. The structural framework 12 may comprise one or more members, panels, cladding, combinations thereof, or the like. The structural framework 12 may serve as a stable base for attachment of other components. Alternatively, or additionally, the structural framework 12 may be configured to form a complete or partial housing for such other components.

The units 10 may comprise one or more electronic display subassemblies 14. Each of the electronic display subassemblies 14 may be connected, directly or indirectly, to the structural framework 12. For example, without limitation, a single electronic display subassembly 14 may be attached to the structural framework 12 to provide a single-sided unit 10. As another example, without limitation, two electronic display subassemblies 14 may be attached to the structural framework 12, such as in a back-to-back arrangement, to provide a double-sided unit 10.

Each of the electronic display subassemblies 14 may comprise some or all of the following, one or more of each of which of the same or different type may be provided: a cover comprising one or more layers and/or optical enhancement films (e.g., antireflective film, polarizers, combinations thereof, or the like), an electronic display 15 (e.g., LCD, LED, plasma, or the like), a backlight (e.g., direct, edge lit), electronic equipment (e.g., media players 25, controllers 18, network connectivity devices 24, FPGAs 26, proof of play modules 28, electronic storage devices, processors, power supplies, sensors (e.g., temperature, air pressure, air samplers, humidity, air speed, voltage, amperage, combinations thereof, or the like), edge computers, combinations thereof, or the like), fans, heat sinks, heat dissipation devices, thermal transfer devices, housings, mounting equipment, peripherals (e.g., telecommunications equipment, cameras, auxiliary touch screens, microphones, emergency beacons, lights, electronic charging adapters, combinations thereof, or the like), combinations thereof, or the like. Alternatively, or additionally, some or all such equipment may be connected, directly or indirectly, to the structural framework at locations between, above, and/or below the electronic display subassemblies 14. Alternatively, or additionally, the layers and/or optical enhancement films may be provided at other items, such as on front surfaces of the electronic display 15.

Some or all of the electronic display subassemblies 14 may be moveably attached to the structural framework 12, though such is not required. For example, the electronic display subassemblies 14 may be attached to the structural framework 12 in a hinged manner, such as about a primarily vertical extending axis or a primarily horizontal extending axis, to permit selective movement between a closed position whereby certain parts of the units 10 are fully or partially sealed, and an open position whereby certain parts of the interior of the unit 10 are exposed for access. Two electronic display subassemblies 14 may be mounted to the structural framework 12 to face in substantially opposing directions, for example without limitation.

One or more intakes and exhausts 16 may be provided at the units 10 for ingesting and exhausting ambient air. The units 10 may comprise one or more open loop airflow pathways for ambient air to travel through some or all of the units 10 to provide thermal management. Alternatively, or additionally, the units 10 may comprise one or more closed loop airflow pathways for circulating gas to travel through some or all of the units 10 to provide thermal management. In exemplary embodiments, the open loops and closed loops are configured to provide thermal interaction between the ambient air and circulating gas, such as but not limited to, with limited to no mixing (e.g., at a heat exchanger), for removing heat generated by the units 10. Such open and/or closed loop airflow pathways may be as shown and/or described in one or more of U.S. Pat. No. 8,854,595 issued Oct. 7, 2014, U.S. Pat. No. 8,767,165 issued Jul. 1, 2014, U.S. Pat. No. 8,654,302 issued Feb. 18, 2014, U.S. Pat. No. 8,351,014 issued Jan. 8, 2013, U.S. Pat. No. 10,660,245 issued May 19, 2020, U.S. Pat. No. 10,194,564 issued Jan. 29, 2019, and/or U.S. Pat. No. 10,398,066 issued Aug. 27, 2019, by way of non-limiting example, the disclosures of each of which are hereby incorporated by reference as if fully restated herein. The structure and/or mechanical operation of the units 10, and the various components thereof, and/or airflow configurations may include those shown and/or described in U.S. Pat. No. 10,485,113 issued Nov. 19, 2019 (the "'133 patent"), by way of non-limiting example, the disclosures of which are hereby incorporated by reference in their entirety. Movements and/or structures for facilitating movement of the electronic display subassemblies 14 may be as shown and/or described in at least the '133 patent, by way of non-limiting example.

Figure 2A:
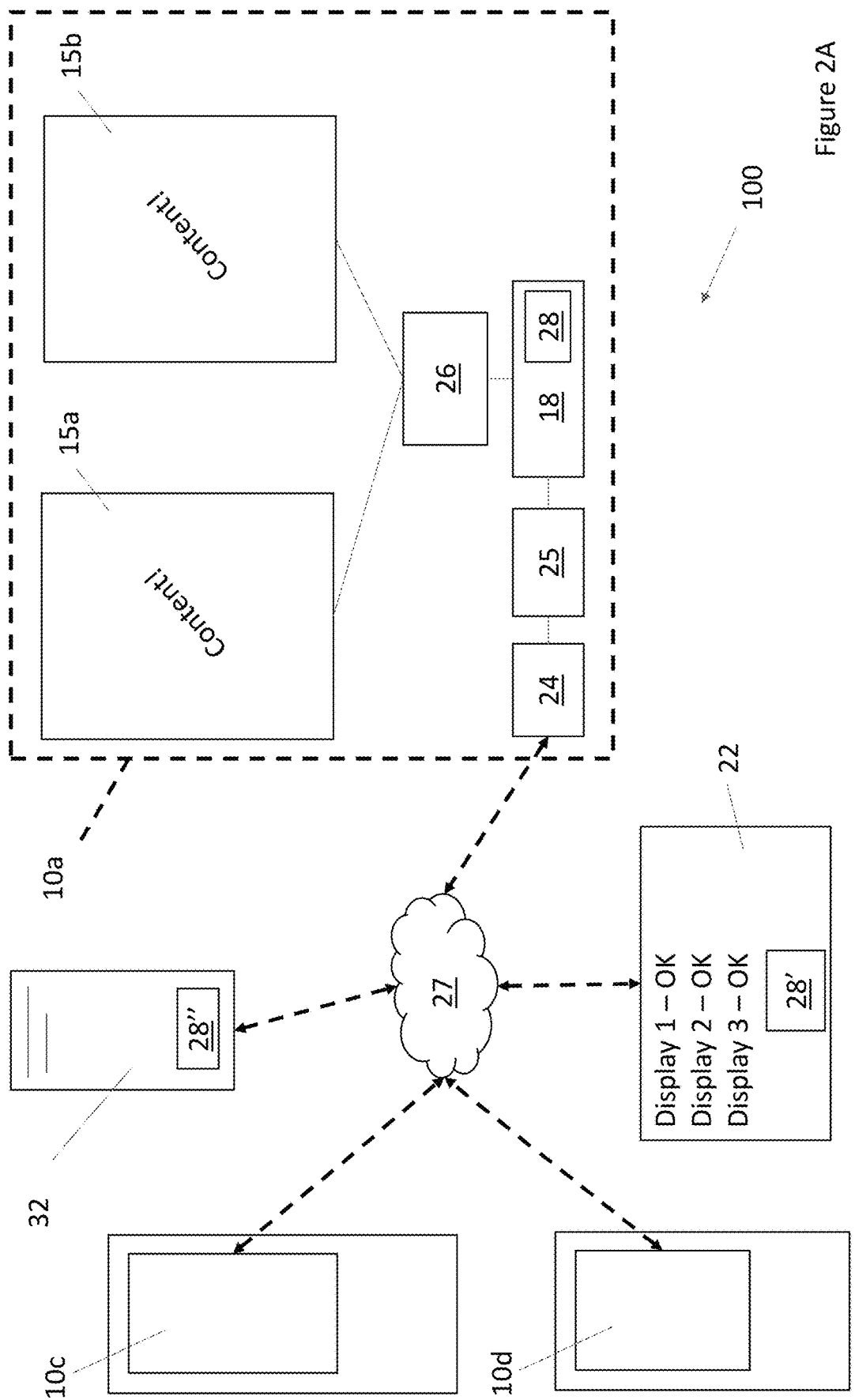
FIG. 2A is a simplified system diagram for providing proof of play for multiple ones of the electronic display assembly of FIG. 1.

FIG. 2A and FIG. 2B illustrate exemplary embodiments of systems 100 for providing proof of play for content items displayed at the electronic displays 15 of the electronic display subassemblies 14 of one or more of the units 10. The content items may include static content (e.g., single electronic images), dynamic content (e.g., video clips), combinations thereof, or the like. In exemplary embodiments, the static content may include a single image displayed for a period of time (e.g., 5 seconds) and the dynamic content may include a series of images, such as a short video clip. The content may comprise advertisements, announcements, or other messages.

Each of the electronic displays 15 of a given unit 10 may be in electronic communication with a unit controller 18. The unit controller 18 may comprise, or be in electronic communication with, a proof of play module 28. Each proof of play module 28 may comprise, or be in electronic communication with, one of more software routines, electronic storage devices, processors, time keeping devices, combinations thereof, or the like. The software routines and other electronically stored items may be stored locally at the proof of play modules 28 or accessed remotely, such as at one or more cloud-based servers. The proof of play modules 28 may be part of the unit controllers 18 or separate therefrom (e.g., cloud-based).

The unit controller 18 may be in electronic communication with, or comprise, one or more media players 25. A separate media player 25 may be provided for some or all of the electronic displays 15 of a unit 10. Alternatively, a media player 25 may be common to multiple ones, or all, of the electronic displays 15 of a unit 10.

Each of the video players 25 may comprise, or be in electronic communication with, a separate FPGA 26. Alternatively, a FPGA 26 may be common to multiple ones of the video players 25 and/or electronic displays 15.

Each of the unit controllers 18 may be in electronic communication with the operations controller(s) 22, such as by way of network communication devices 24 and/or networks 27. The networks 27 may comprise cellular networks, wireless networks, wired networks, combinations thereof, or the like. The operations controller(s) 22 may comprise personal computers, smartphones, tablets, network operation centers, combinations thereof, or the like.

Each of the unit controllers 18 may be in electronic communication with one or more databases 32. The database(s) 32 may comprise one or more image and/or video files, proof of play information, CRC codes, information about the units 10, customer information, combinations thereof, or the like. The database(s) 32 may be separate from, or part of, the units 10. The operations controller(s) 22 may be in electronic communication with the database(s) 32. Alternatively, or additionally, the database(s) 32 may be part of the operations controller(s) 22.

The operations controller 22 may be in electronic communication with one or more customer devices, such as but not limited to, personal computers, smartphones, tablets, combinations thereof, or the like. Alternatively, or additionally, the customer devices may be in electronic communication with some or all of the unit controller 18 and/or databases 32.

The unit controller 18 may be in electronic communication with various components of the units 10 such as, but not limited, to fans, sensors, electronic storage devices, processors, computers, cameras, peripheral devices, combinations thereof, or the like. The same or different proof of play module 28' may alternatively, or additionally, be provided at, or be in electronic communication with, the operations controller(s) 22. The same or different proof of play module 28" may alternatively, or additionally, be provided at, or be in electronic communication with, the proof of play database(s) 32.

Any number of units 10 of the same or different type may be connected to the operations controller 22. Particularly, but not limited to, where just a single unit 10 is utilized, the unit controller 18 may act as the operations controller 22. Multiple operations controller 22 may be utilized, such as for various subgroups of units 10 (e.g., a Midwest operations controller 22, a northeast operations controller 22, etc.).

Figure 3:
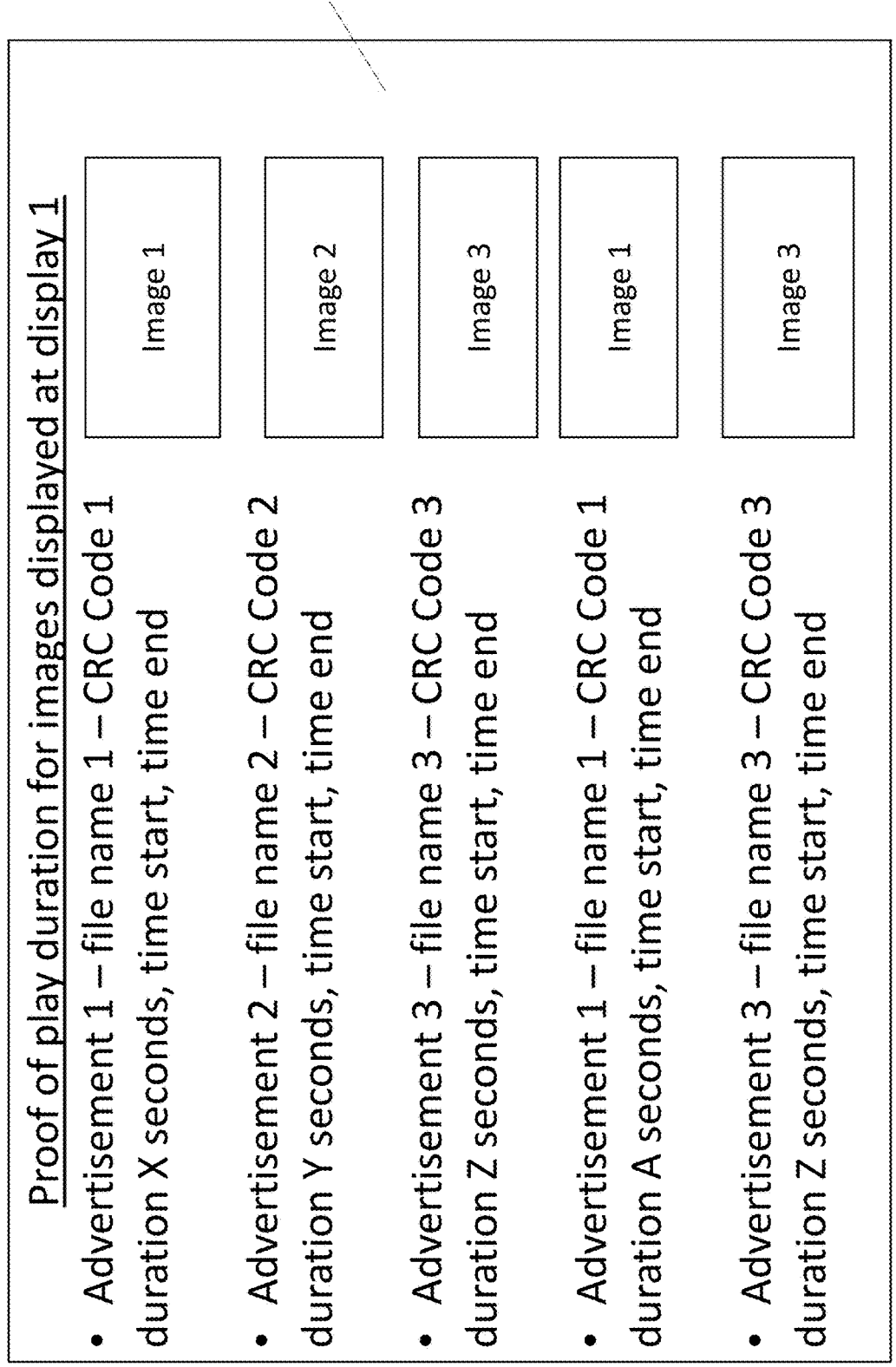
FIG. 3 is an exemplary proof of play report produced by the systems of FIGS. 2A-2B.

FIG. 3 illustrates an exemplary proof of play report 30. The reports 30 may include duration of play information for images played at one or more of the units 10 and/or electronic displays 15. The report 30, in exemplary embodiments, may comprise, for example, without limitation, order of play information, file name information, CRC code information, duration of play information, time start information, time end information, unit 10 information, display 15 information, media player 25 information, content item data (e.g., electronic image data, thumbnail images, full size images, or the like), play count information for content items (e.g., content item specific, customer specific, across all units 10 and/or displays 15, unit 10 specific, display specific 15, time period specific, combinations thereof, or the like), combinations thereof, or the like. The duration of play may be calculated by the unit controller 18, operations controller 22, proof of play modules 28, combinations thereof, or the like, such as from the start and end of play times. The duration of play information may only be available for static content, and/or may be available for dynamic content.

The database(s) 32 may comprise data sufficient to generate the reports 30. The report 30 may comprise any type or kind of information provided in any format or organized in any fashion. The report 30 may be filterable, sortable, combinations thereof, or the like. The reports 30 may be specific to particular images, electronic displays 15, units 10, customers, owners, operators, users, combinations thereof, or the like. The reports 30 may be provided in electronic or physical form.

Figure 4A:
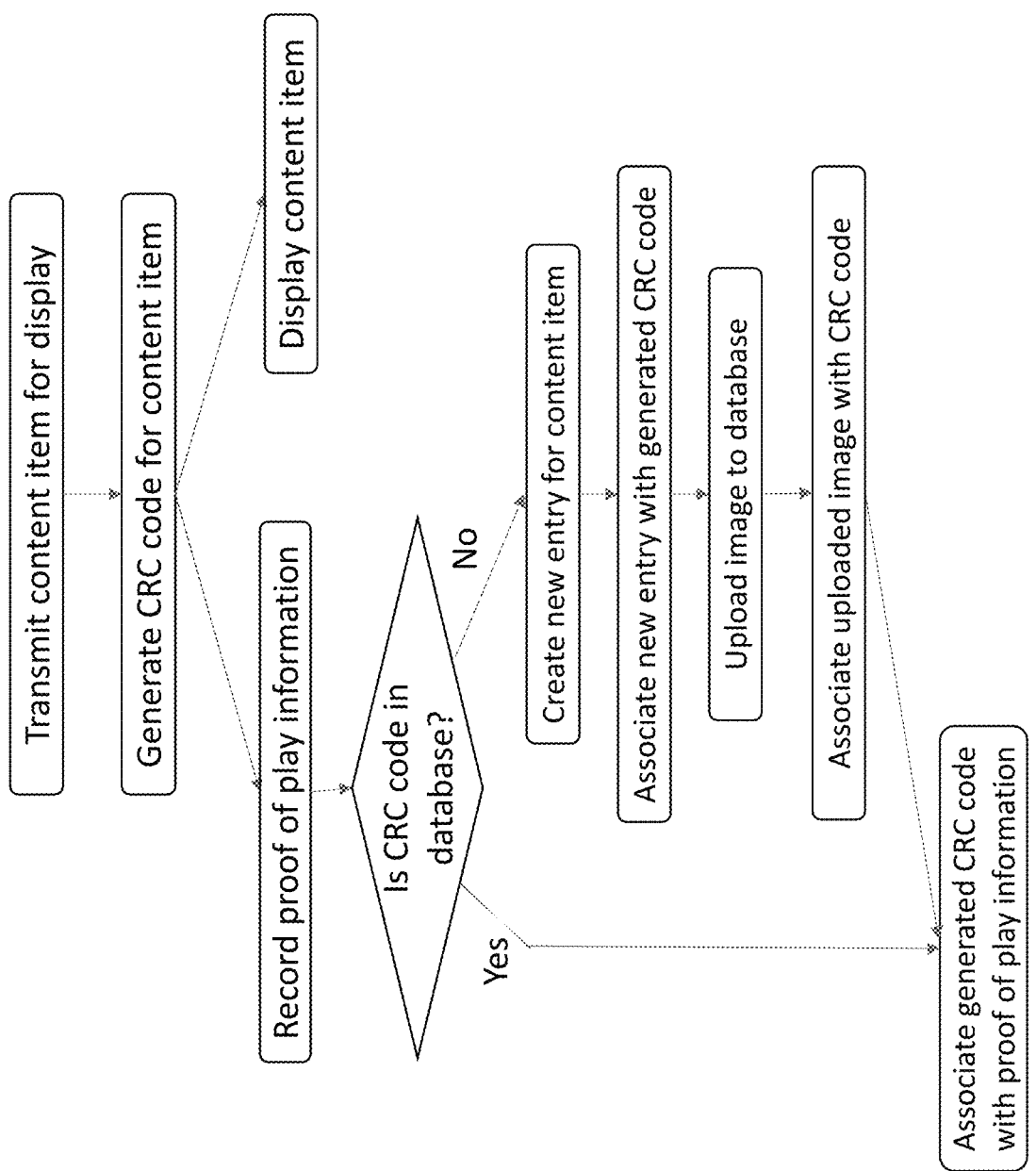
FIG. 4A is a flow chart with exemplary logic for operating the systems of FIGS. 2A-2B.

FIG. 4A is a flow chart with exemplary logic for generating proof of play information for content items comprising electronic images displayed at the electronic display assembly 10, and FIG. 4B is a flow chart with exemplary logic for generating proof of play reports based on the proof of play information. Playlists may be electronically provided to the media players 25. In exemplary embodiments, such playlists may be provided from the operations controller(s) 22, though they may be loaded locally, provided from customer devices, or by other ways. The media players 25 may be configured to execute the provided playlists. These playlists may be electronically recorded by the proof of play modules 28 or otherwise.

Data leaving the media players 25 may pass through the unit controller 18, which may comprise, or be in electronic communication with, the proof of play module 28, on way to the FPGAs 26 and/or the electronic displays 15. In this manner, the proof of play module 28 may be configured to receive data regarding image data actually transmitted for play by the media player(s) 25. As such, the data leaving the media player 25 may be analyzed for proof of play rather than, or in addition to, playlists provided to the media player 25. This may provide more accurate proof of play and may reduce or eliminate discrepancies between the provided playlists and the actually displayed images.

CRC codes may be generated for each and every content item and/or image transmitted for display by the media players 25 to the electronic displays 15. The CRC codes may be generated based on an analysis of the entire image or portions thereof, such as but not limited to various, specific subpixels. Alternatively, or additionally, the CRC codes may be generated for each new image, periodically, randomly, combinations thereof, or the like. The CRC codes may be generated by the proof of play modules 28, though such is not required. Alternatively, or additionally, the proof of play modules 28 may be configured to receive CRC codes for all images displayed by the media player(s) 25 as generated by another component or subsystem. The CRC codes may comprise checksums. Any type or kind of code may be generated based on any type or kind of CRC technique, or combinations of techniques. The CRC codes may serve as a content item identifier in exemplary embodiments. The CRC codes may serve as a customer identifier in exemplary embodiments.

Where static content items are transmitted by the media player 25 for display, the CRC code generated may remain the same, or substantially the same, while the static content item continues to be transmitted by the media player 25 for display. For example, without limitation, where a static content item is transmitted for display, the CRC code generated may be the same each time the particular static content item (e.g., electronic image data) is transmitted by the media player 25 for display. This may permit counting the number of times a particular static content item is displayed based on the number of discrete, non-continuous instances in which the CRC code is generated. In exemplary embodiments, the proof of play modules 28 may be configured to count instances where the same CRC code is continuously generated without interruption over a period of immediately consecutive instances to be a single play (e.g., the same image being played for 10 seconds). This may also permit tracking play count across multiple units 10.

This may also permit determination of a duration of play for static content items. For example, without limitation, each time the generated CRC code changes (see also e.g., FIG. 5B), a determination may be made, such as but not limited to at the proof of play module 28, that a new image and/or content item is starting or has started and records a start time accordingly. When the CRC code changes again, the proof of play module may determine that another new image and/or content item is starting or has started and an end time may be recorded. From the start and end times, a duration of play may be derived.

Where dynamic content is utilized (e.g., multiple sequential images, video clips, GIFS, combinations thereof, or the like), a single CRC code, or multiple CRC codes, may be generated and/or utilized for each of the dynamic content items. For example, without limitation, a CRC code may be generated for a particular frame of a video, such as, but not limited to, the first frame, last frame, X number frame, combinations thereof, or the like. Multiple such CRC codes may, alternatively or additionally, be generated and/or utilized. For example, without limitation, a composite CRC code may be generated by combining CRC codes for each image in the dynamic content (e.g., addition, subtraction, averaging, numerical amalgamation, combinations thereof, or the like). As another example, multiple CRC codes may be stored for such dynamic content, such as for some or all images in such content. In this manner, the same CRC codes may be repeatably generated for the same dynamic content item. In this manner, a play count for dynamic content items may be determined.

Where CRC codes for first and last images of a dynamic content item are known, duration of play may be provided. For example, without limitation, a start time may be recorded each time the CRC code for the first image of the dynamic content item is generated and an end time may be recoded each time the CRC code for the last image of the dynamic content item is generated, thereby permitting derivation of duration of play information.

In exemplary embodiments, without limitation, the proof of play module 28 may be configured to compensate for minor variations in CRC codes and/or images, such as, but not limited to, due to display 15 settings and/or type, media player 25 settings and/or type, combinations thereof, or the like.

The unit controllers 18 and/or FPGAs 26 may be configured to cause the images commanded to be displayed by the media player(s) 25 to be displayed at the respective one or ones of the electronic display(s) 15.

The CRC codes for displayed images may be reported to the database(s) 32 for proof of play purposes. Initially, a check may be performed to see if the CRC code of an image is already stored at the database(s) 32. If not, the image data may be uploaded to the database(s) 32 for storage in association with the CRC code, customer information, proof of play information, combinations thereof, or the like. The image data may comprise raw image data, compressed image data, thumbnail image data, or the like. Alternatively, or additionally, the image data may be compressed or reformatted for storage, though such is not required. In this manner, a representation of the content item display may be reproduced, such as in the report 30.

The proof of play data may be stored at the database(s) 32 in association with the CRC codes, customer information, image data for the played images, combinations thereof, or the like. The proof of play data may include order of play information, file name information, CRC code information, duration of play information, time start information, time end information, unit 10 information, display 15 information, media player 25 information, play count information, time and date information, combinations thereof, or the like.

The customer information may include a customer name, unique customer identifier, combinations thereof, or the like.

In exemplary embodiments, each image played and/or analyzed for proof of play may be time stamped or otherwise associated with a time of play to derive time information (e.g., start time, end time, duration of play). For example, without limitation, each CRC code generated for each image may be time stamped. Where static content is played, the start and end times of play may be determined where the CRC codes generated changes from a first code to a second code. For example, each time a newly generated CRC code is different from a prior generated CRC code, a new start time may be recorded. So long as the static content continues playing, the CRC code generated may remain the same, such as the second code. So, when the CRC code changes again, such as to a third code, the end time may be recorded as the final instance the prior CRC code (e.g., the second code) was generated, and a new start time for the new content item may be recorded (e.g., for the third code). Only the start and end times may be recorded. Alternatively, or additionally, each image generated may be time stamped and the start and end times may be subsequently identified to derive duration of play information. Alternatively, or additionally, a timer may be started and ended upon changing of the CRC codes to determine duration of play.

For dynamic content, the start and end times may be determined based on commands provided to, or data leaving, the media player 25 indicating continued play of the dynamic content. Alternatively, or additionally, duration of play information in such instances may be preprogrammed. Alternatively, or additionally, duration of play information may be determined from known CRC codes for a first image in a given dynamic content item and a last image in a given dynamic content item.

One or more images and/or content items may be uploaded for proof of play. For example, without limitation, a customer may submit a number of images and/or content items it wishes to obtain proof of play reports 30 for. CRC codes for each of the provided images and/or content items may be generated. The CRC codes may be generated by the proof of play modules 28, though such is not required.

The database(s) 32 may be queried for all proof of play information associated with the queried CRC code(s) to generate the proof of play report(s) 30. The proof of play report(s) 30 may be generated by the proof of play modules 28, the database(s) 32, unit controller 18, and/or operations controllers 22. The proof of play reports 30 may comprise the images representing content items, though such is not required.

By using the CRC codes, such as instead of actual screen captures, the amount of data that is stored at the database(s) 32 may be drastically reduced.

Figure 5A:
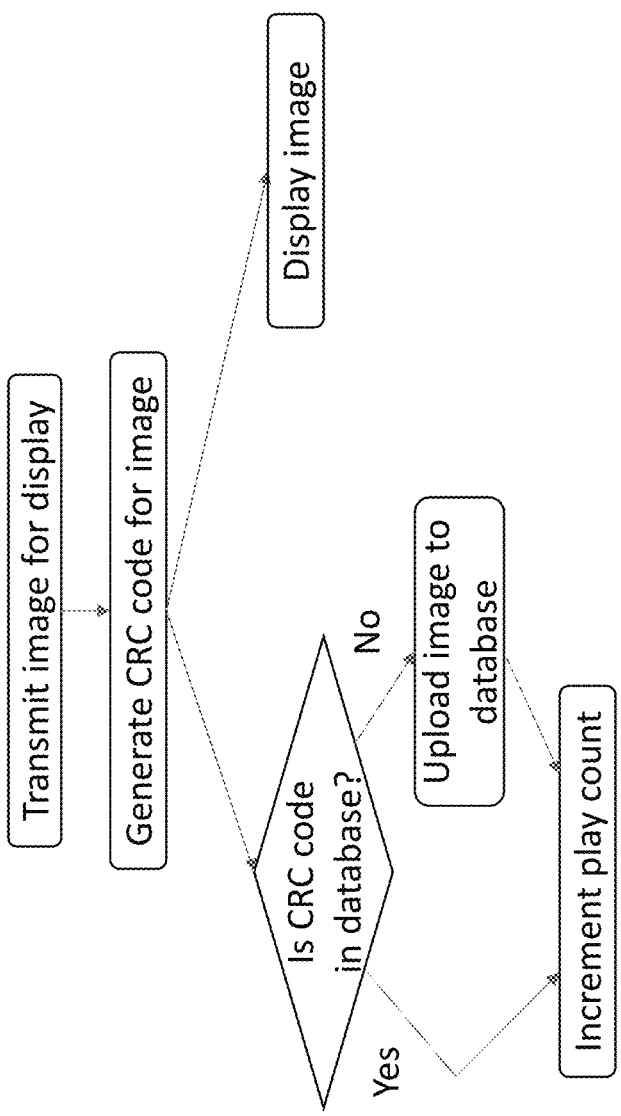
FIG. 5A is a flow chart with other exemplary logic for operating the systems of FIGS. 2A-2B.
Figure 5B:
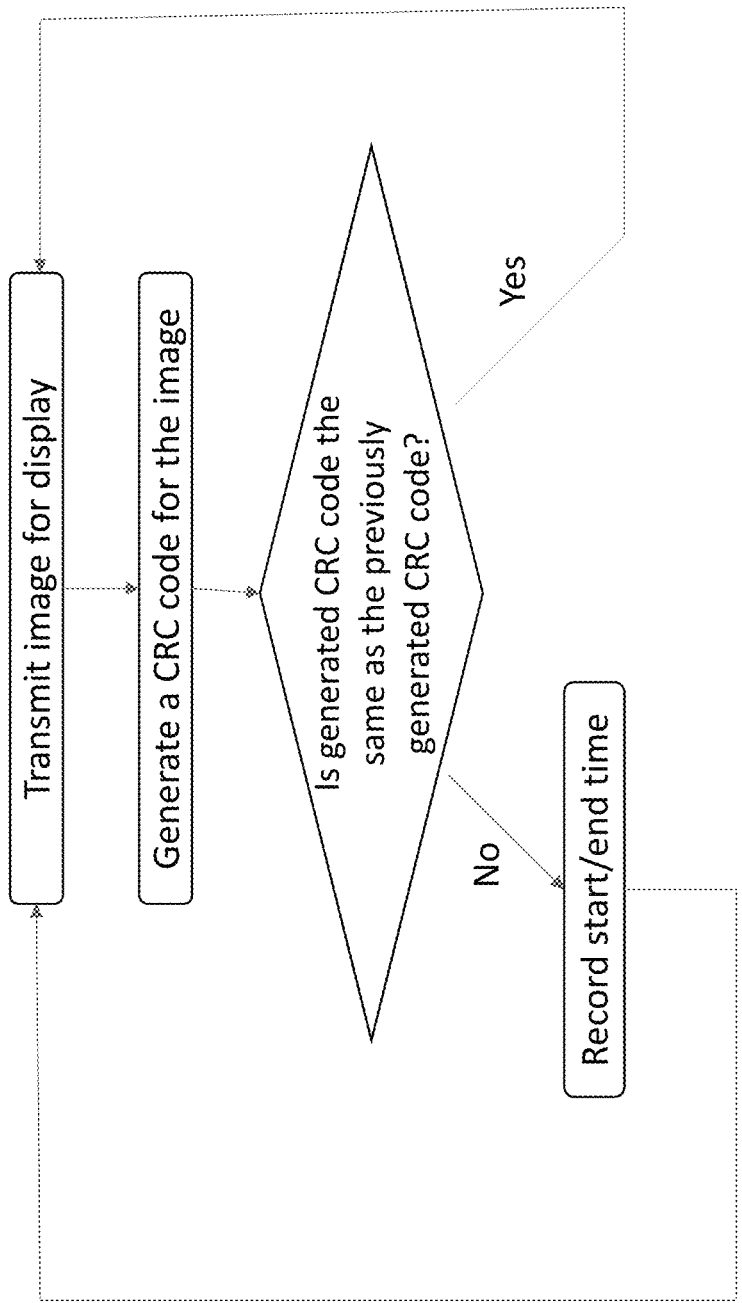
FIG. 5B is a flow chart with other exemplary logic for operating the systems of FIGS. 2A-2B.

FIG. 5A and FIG. 5B provide other exemplary logic for providing proof of play information for images displayed at the electronic display assembly 10. Such logic may be employed, together or separately, in addition to, or alternatively to, other logic shown and/or described herein. The proof of play module 28 may be configured to generate a CRC code for each image the media player 25 transmits to the display(s) 15. In exemplary embodiments, the CRC code is generated for each transmitted image, however, in other exemplary embodiments, a CRC code may be generated for each new image, each new content item (such as but not limited to a determined by the electronic playlist or otherwise), periodically, randomly, combinations thereof, or the like. If the database(s) 32 already comprises the CRC code, the play count associated with the CRC code, stored image, or other proof of play or image information may be incremented, such as by 1, to reflect the play of the content item. If the database(s) 32 does not already comprise the CRC code (and therefore a copy of the image is presumably not stored), electronic image data for the content item may be uploaded (such as, but not limited, to in compressed form), such as before the play count is incremented. Alternatively, or additionally, a new entry into the database(s) 32 to track proof of play for the new content item may be generated. The new entry may initially set the play count to 1 in exemplary embodiments. In this way, a play count may be generated, such as for use in the proof of play report 30 and/or to generate a customer specific proof of play summary report 30' and/or content item specific proof of play summary report 30" as further detailed herein.

FIG. 6A and FIG. 6B illustrate exemplary logic for generating the reports 30, 30', and/or 30". Such logic may be employed, together or separately, in addition to, or alternatively to, other logic shown and/or described herein. An image and/or content item for proof of play may be uploaded and a CRC code may be generated and used to retrieve associated proof of play information from the database(s) 32, such as, but not limited to, the total number of times the image and/or content item has been played and/or at what displays 15 and/or units 10. Alternatively, or additionally, the CRC code itself may be entered, or customer information provided for query to generate the reports 30, 30', and/or 30". The reports 30, 30', and/or 30" may be specific to a time frame.

Figure 7A:
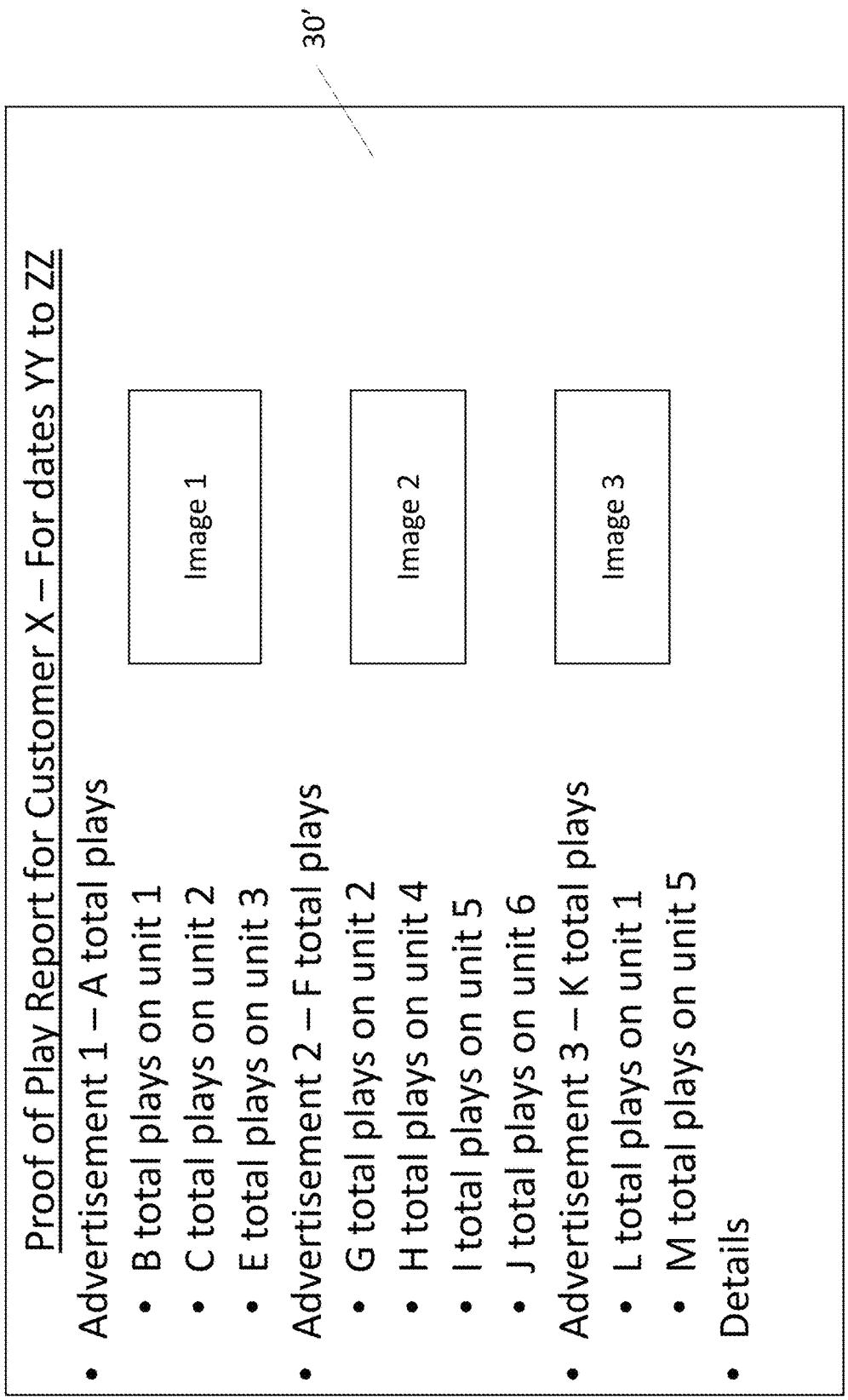
FIG. 7A is an exemplary customer specific proof of play summary report produced by the systems of FIGS. 2A-2B and/or the logic of FIG. 6A.
Figure 7B:
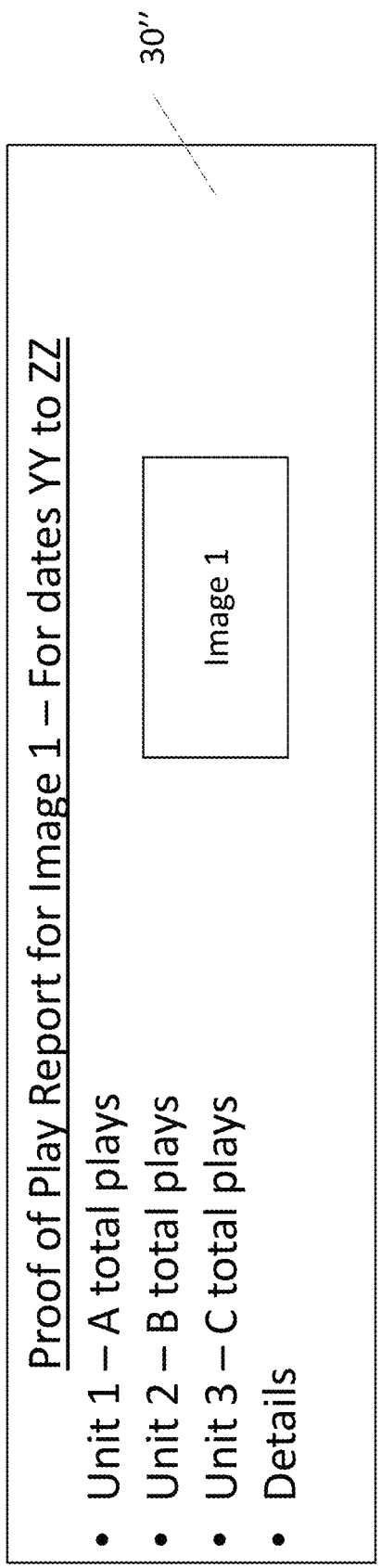
FIG. 7B is an exemplary content item specific proof of play summary report produced by the systems of FIGS. 2A-2B and/or the logic of FIG. 6B.

As shown with regard to FIG. 7A and FIG. 7B, the summary reports may comprise, for example without limitation, a total play count for each image and/or content item for which proof of play is requested and/or each image and/or content item associated with a given customer. The summary reports 30' and/or 30" may provide total play count information specific to various units 10 or displays 15, by way of non-limiting example. Alternatively, or additionally, the summary reports 30' and/or 30" may provide a compressed or thumbnail version of the image and/or content item in question, by way of non-limiting example. The summary reports 30' and/or 30" may comprise other proof of play information, such as, but not limited to, the information shown and/or described in the reports 30, and/or may provide an option to provide and/or view such further information.

The reports 30, 30', 30" may be customer specific, image specific, content item specific, unit 10 specific, display specific 15, date specific, date range specific, time specific, time range specific, geographically specific (as to the location of the units 10), time of day specific (each evening, each morning, etc.), season specific, combinations thereof, or the like. Alternatively, or additionally, the reports 30, 30', 30" may be filterable by such criteria or the like. The reports 30, 30', 30" may include proof of play information for a given image and/or content item across multiple units 10 or a single unit 10.

The proof of play information may be stored in association with the CRC code information, customer information, combinations thereof, or the like to facilitate generation of the reports 30, 30', 30".

The type and/or arrangement of information as shown in the reports 30, 30', 30" is merely exemplary and not intended to be limiting. Any type of information may be provided in any arrangement.

Electronic communications described herein may be one-way or two-way. Connections described herein may be direct or indirect.

Any of the steps shown and/or described herein may be omitted, repeated, performed out of order, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A proof of play information system, said system comprising:
   one or more electronic display assemblies, each comprising:
      an electronic display configured to display images;
      a media player configured to provide content items for display at the electronic display, including static content items, each of which comprises a single advertising image for display in each play instance for a period of consecutive seconds; and
      a unit controller electronically interposed between the media player and the electronic display and comprising software instructions, which when executed, configure one or more processors to:
         generate redundancy check codes for the content items transmitted from the media player to the electronic display such that redundancy check codes are consistently generated for the content items, including consecutively generating the consistent redundancy check code for each of the static content items in each of the play instances; and
         determine if a consistent redundancy check code is consecutively generated for a respective one of the content items in a respective one of the play instances, and if so, cause a play count associated with the respective one of the content items to be incremented, wherein the play count is stored in memory and maintained over time such that non-consecutive play instances of respective one of the content items result in cumulative increases to the play count.

2. The system of claim 1 further comprising:
   the memory comprises a database comprising the redundancy check codes for at least some of the content items, each associated with one of the play counts; and
   an operations controller in electronic communication with each of the one or more electronic display assemblies and comprising software instructions, which when executed, configure one or more processors of the operations controller to: determine if the consistent, consecutively generated redundancy check code generated for the respective one of the play instances is stored in the database, and if so, increment the play count associated with the consistent, consecutively generated redundancy check code, and if not, create a new entry for the respective one of the content items comprising the consistent, consecutively generated redundancy check code.

3. The system of claim 2 wherein:
the operations controller comprises additional software instructions, which when executed, configure the one or more processors of the operations controller to: where the new entry is created, increment the play count for the new entry from zero to one.

4. The system of claim 3 wherein:
the new entry for the respective one of the content items comprises a copy of at least one image for the respective one of the content items.

5. The system of claim 4 wherein:
the copy of the at least one image for the respective one of the content items comprises a compressed version of the at least one image.

6. The system of claim 2 wherein:
each of the one or more electronic display assemblies comprise a network connectivity device in electronic communication with the unit controller; and
the database and the operations controller are remote from the one or more electronic display assemblies.

7. The system of claim 6 wherein:
at least some of the one or more processors are remote from the one or more electronic display assemblies.

8. The system of claim 1 wherein:
the one or more processors are each part of a respective one of the unit controllers of the one or more electronic display assemblies such that the one or more processors are local to the one or more electronic display assemblies.

9. The system of claim 1 wherein:
the unit controller of each of the one or more electronic display assemblies comprises additional software instructions, which when executed, configure the one or more processors to, or the system further comprises an operations controller in electronic communication with each of the one or more electronic display assemblies and comprising software instructions, which when executed, configure one or more processors of the operations controller to: for each instance the consistent redundancy check code is consecutively generated for the respective one of the content items, identify a first time and a last time the consistent redundancy check code is consecutively generated for the respective one of the content items and record a duration between the first time and the last time as a duration of play for the respective one of the content items.

10. The system of claim 1 wherein:
each of the redundancy check codes comprises a cyclic redundancy check code.

11. The system of claim 10 wherein:
each of the redundancy check codes comprise a checksum.

12. The system of claim 1 further comprising:
each of the one or more electronic display assemblies comprise a field programmable gate array electronically interposed between the controller and the electronic display.

13. The system of claim 1 wherein:
the content items comprise dynamic content items, each comprising at least one video comprising multiple of the images; and
the unit controller of each of the one or more electronic display assemblies comprises additional software instructions, which when executed, configure the one or more processors to: numerically amalgamate a respective set of the redundancy check codes generated for each of the dynamic content items into a single code.

14. The system of claim 1 wherein:
the one or more electronic display assemblies comprise multiple electronic display assemblies;
the play counts are associated with users;
at least two of the play counts associated with a given one of the unit controllers of a given one of the electronic display assemblies are each associated with different ones of the users; and
the unit controller of each of the electronic display assemblies comprises additional software instructions, which when executed, configure the one or more processors to, or the system further comprises an operations controller in electronic communication with each of the electronic display assemblies and comprising software instructions, which when executed, configure one or more processors of the operations controller to: receive a request for a proof of play report for a user; retrieve the play counts associated with the user; and generate a report comprising the retrieved play counts.

15. The system of claim 14 wherein:
the play counts are associated with the users by way of customer identifiers;
the request comprises a respective one of the customer identifiers; and
the retrieved play counts comprise those associated with the respective one of the customer identifiers.

16. The system of claim 1 wherein:
the electronic display of each of the one or more electronic display assemblies comprises a directly backlit liquid crystal type display housed within a structural assembly comprising at least one airflow pathway for ambient air.

17. The system of claim 1 wherein:
at least some of the one or more electronic display assemblies comprise multiple electronic displays; and
the unit controller of each of the electronic display assemblies comprises additional software instructions, which when executed, configure the one or more processors to: generate the redundancy check codes on an electronic display specific basis.

18. A method for providing proof of play information, said method comprising:
providing content items from media players to electronic displays of the electronic display assemblies, including static content items, each comprising a single advertising image displayed in each play instance for a period of consecutive seconds;
generating, by way of controllers electronically interposed between the media players and the electronic displays of the electronic display assemblies, redundancy check codes for the content items transmitted from the media players to the electronic displays such that redundancy check codes are consistently generated for the content items, including consecutively generating the consistent redundancy check code for each of the static content items in each of the play instances;
determining, in at least some of the play instances, that a consistent redundancy check code is consecutively generated for a respective one of the content items, and in such play instances, causing a play count provided at a database and associated with the respective one of the content items to be incremented; and
maintaining the database over time such that non-consecutive play instances of the respective one of the content items result in cumulative increases to the play count.

19. The method of claim 18 further comprising:
storing, at the database and in association with each of the play counts, a compressed version of at least one of the images for the respective one of the content items, wherein each of the play counts is associated with a respective customer identifier, and wherein at least two of the customer identifiers associated with a given one of the electronic display assemblies are different from each other;
receiving a request for a proof of play report from a remote user device, said request comprising a given customer identifier;
retrieving, from the database, the play counts associated with the content items associated with the given customer identifier;
generating a report comprising the retrieved play counts and the compressed versions of the images associated with each of the retrieved play counts; and
transmitting the report to the remote user device.

20. A proof of play information system, said system comprising:
electronic display assemblies, each comprising:
an electronic display configured to display images;
a media player configured to provide content items for display at the electronic display, including static advertising images for display for a period of seconds;
a unit controller electronically interposed between the media player and the electronic display, said unit controller comprising software instructions, stored at one or more electronic storage devices, which when executed, configures one or more processors to:
generate redundancy check codes for the content items transmitted from the media player to the electronic display such that a respective redundancy check code is consistently generated for a respective one of the content items; and
determine if a given redundancy check code is consecutively and consistently generated for a given one of the content items, and if so, cause a play count associated with the given one of the content items to be incremented;
a database in electronic communication with the unit controllers by way of one or more networks, said database comprising the play counts for the content items and a version of at least one image for each of the content items; and
an operations controller in electronic communication with each of the one or more electronic display assemblies and comprising software instructions, which when executed, configure one or more processors of the operations controller to:
determine if the consistent, consecutively generated redundancy check code generated is stored in the database, and if so, increment the play count associated with the consistent, consecutively generated redundancy check code, and if not, create a new entry for the respective one of the content items comprising the consistent, consecutively generated redundancy check code;
for each instance the consistent redundancy check code is consecutively generated for the respective one of the content items, identify a first time and a last time the consistent redundancy check code is consecutively generated for the respective one of the content items and record a duration between the first time and the last time as a duration of play for the respective one of the content items;
associate each of the play counts with a respective customer identifier;
receive a request for a proof of play report for a user, said request comprising a given customer identifier;
retrieve the play counts associated with the given customer identifier; and
generate a report comprising the retrieved play counts.

* * * * *